June 10, 1930.   C. U. FRAZIER   1,762,684
RAISIN CLEANING APPARATUS
Filed April 29, 1927
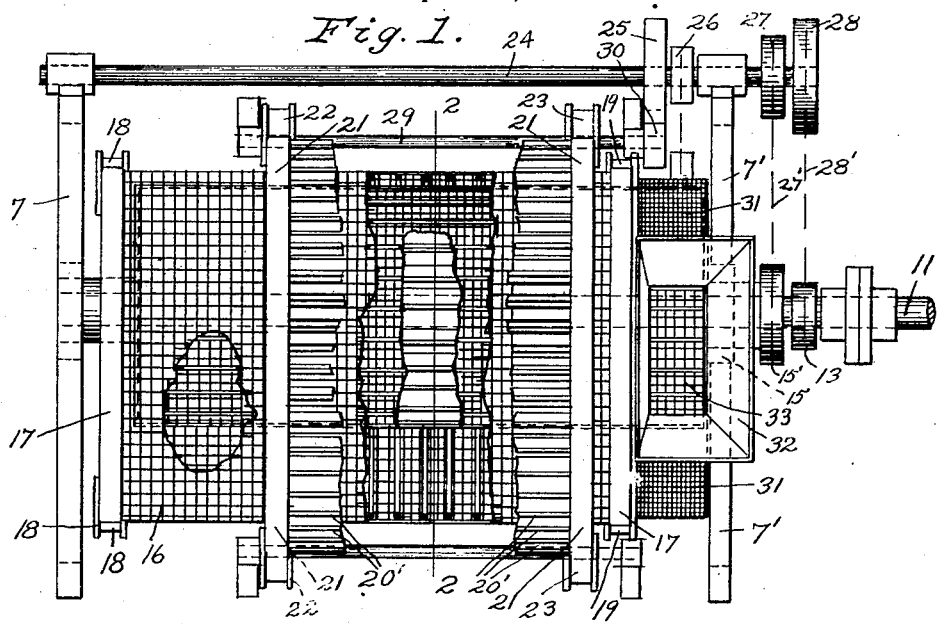
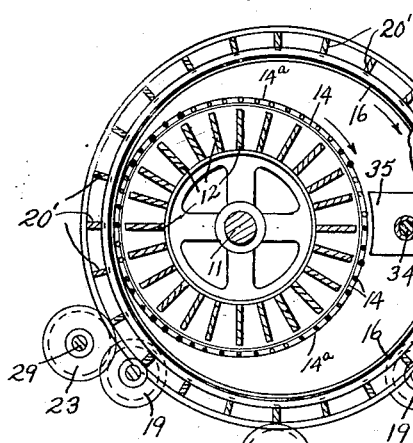
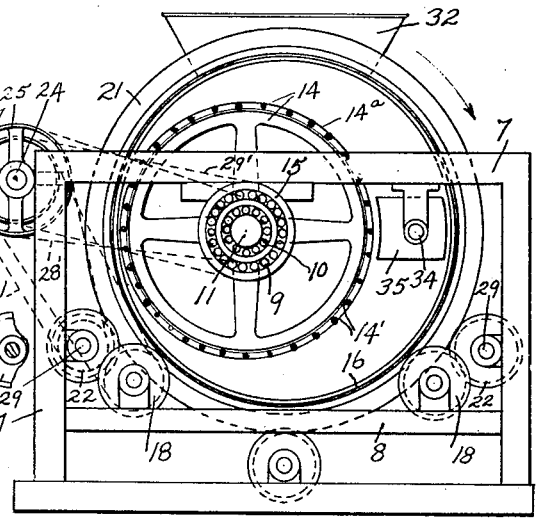
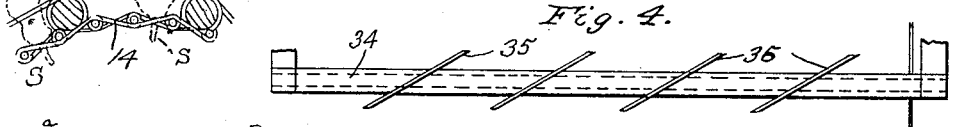
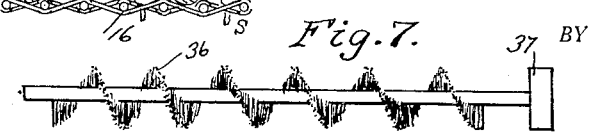
INVENTOR.
Cephas U. Frazier,
BY
ATTORNEY Patented June 10, 1930

1,762,684

UNITED STATES PATENT OFFICE

CEPHAS U. FRAZIER, OF OROSI, CALIFORNIA

RAISIN-CLEANING APPARATUS

Application filed April 29, 1927. Serial No. 187,509.

My invention relates to an apparatus for cleaning raisins and putting them in good condition for the market and it has among its salient objects to provide a machine which will continuously clean the raisins by knocking the dust and dirt therefrom and for breaking the stems off and removing them. I accomplish this by providing revolving screens of cylindrical form, eccentrically positioned one within the other, whereby the raisins are rolled between the screens and separated and their stems are broken off and in connection with said screens are fan-like members within the inner screen and around the outside of the outer screen, moving close to the screen so that when the stems of the raisins are projected through said screens, said fan-like members knock said stems from the raisins. Another object of the invention is to provide a special form of screen whereby the raisins will be readily positioned so as to cause the stem ends to be projected through said screens.

In order to explain my invention, I have illustrated one practical embodiment thereof on the accompanying sheet of drawings, which I will now describe.

Figure 1 is a plan view of an apparatus embodying my invention, with parts broken away to show the arrangement;

Figure 2 is a vertical sectional view taken on line 2—2 of Fig. 1;

Figure 3 is an end elevation of the apparatus from the left hand end of Fig. 1;

Figure 4 is a detail showing baffle members for causing the raisins to move through the apparatus lengthwise of the screens;

Figures 5 and 6 are enlarged details of the special screen construction; and

Figure 7 is a view of a revoluble brush which can be used in place of the baffle members shown in Fig. 4.

Referring now in detail to the drawings, my apparatus as here illustrated for explanatory purposes comprises supporting frame members 7, 7, at oposite ends, with cross intermediate members 8. Suspended from the underside of the top frame members, designated 7', as seen in Fig. 3, are anti-friction bearings 9 and 10, concentrically arranged, a central shaft 11 being rotatably supported in the inner bearing 10, as indicated, being the same at both ends, said shaft 11 carrying a fan-like structure 12, Fig. 2, and being driven from any suitable source of power applied thereto. Rotatably mounted around the outside of said fan-like structure is a cylindrical screen member 14, having end hub-like portions 15, forming a part of the bearings 9, the shaft 11 and its fan-like structure 12 being supported and turning in the bearings 10, and the outside screen member 14 being supported by and turning on the bearings 9, and driven in a manner again herein referred to.

Rotatably supported eccentrically around the outside of said inner screen structure 14, is a larger cylindrical screen 16, having the end bands or hoops 17, supported in pulleys 18, 18 and 19, 19, at its opposite ends, and driven in a manner hereinafter again referred to.

Supported around the larger screen member 16, is a larger and second fan-like structure 20, with narrower fan blades or members 20', with end rings or hoops, 21, supported in and rotating in pulleys 22, 22 and 23, 23, said fan-like structure being shorter than the screen 16, as will be understood from Fig. 1.

Mounted in the upper part of the frame members, at one side thereof, Figs. 1 and 3, is a shaft 24, provided with the pulleys 25, 26, 27 and 28. The supporting pulleys 22 and 23, for the larger fan structure 20, at one side of the frame, are mounted upon a common shaft 29, and this shaft is provided with a driving pulley 30, connected to be driven from pulley 25, on the shaft 29, by a belt 31, Fig. 3. The shaft 11 has a pulley 13 thereon and connected with pulley 28, for driving shaft 24, as by means of a belt 28'. The inner screen 14, having the hub bearing members, as 15, also has a driving pulley 15' thereon and this is connected to be driven from the pulley 27, on said shaft 24, by means of a belt indicated at 27'.

Over the right hand end of the inner fan and inner screen is a fixed, cap-like screen 31, the outer end being closed and the inner end opening over the inner screen 14, said cap-like screen having its top edge opened and a hopper 32 connected therewith, into which hopper the raisins are placed, to be fed down through a coarse bottom screen 33, in the bottom of the hopper and through which the raisins must pass and be somewhat separated from each other, said raisins then falling onto the inner cylindrical screen 14, and then down within the outer screen and as said screens are revolved in the same directions, said raisins are worked around between said screens where they run closer together and are carried upwardly between said screens and over the inner screen again. A supporting shaft 34, is inserted through said outer larger screen, suspended under the top frame members 7', as seen in Fig. 3, and is provided with a series of spaced and inclined baffle members 35, which operate as the raisins fall thereupon to move them forwardly in the screen and toward its open end, from which they are discharged. Instead of using the fixed baffle members 35, I have shown in Fig. 7, a revoluble brush 36, with driving pulley 37, which can be substituted for said baffles as a means for moving said raisins forwardly toward the discharge end of the apparatus, said brush also operating to clean the raisins as they come in contact with it.

Referring now to Figs. 5 and 6, I will describe my screen structure. The screen 14 is of cylindrical form and I provide a series of spaced rods, as 14', lengthwise thereof and these are bound to the screen proper by a wire 14$^a$ which passes around each rod and a strand of the screen and then over to and around the next rod, thus tying the rods to the outside of the screen 14, said tying wires being sufficiently close together to hold raisins endwise therein, as at R Fig. 5, with their stems s projecting through the screen proper, in which position they are knocked off by the fan member 12. In Fig. 6 the outer or larger screen is shown in enlarged detail and is similar to that shown in Fig. 5, except that the screen is on the outside and the rods 16' and the tying wires 16$^a$ are on the inside, and when the raisins R are lodged between said tying wires, with their stems projecting outwardly through the screen 16, said stems are knocked off by the outer fan members 20'. Thus as the raisins are revolved in said screens and roll around therein and are rubbed over the screens and as their stems project through the screens the fan elements moving close to the screens knock said stems off, they are thoroughly cleaned and separated and made ready for the market in an economical and effective manner, and while I have shown and described one practical embodiment of my invention, I am aware that changes in details and arrangements can be made without departing from the spirit thereof, and I do not limit the invention to the showing made for descriptive purposes, except as I may be limited by the hereto appended claims.

I claim:

1. A raisin cleaning apparatus including in combination, a plurality of cylindrical screens eccentrically one within the other, means for feeding raisins between said screens whereby their stems can protrude through said screens in opposite directions, and a revolving fan-like member adjacent each screen and adapted to knock said protruding raisin stems therefrom.

2. A raisin cleaning apparatus including in combination, a plurality of cylindrical screens revolubly supported, eccentrically one within the other, means for feeding raisins into the outer screen whereby they are carried around between said screens where said screens move close together, and fan-like members revolubly supported adjacent the surface of each screen, whereby raisin stems protruding through said screens are knocked from said raisins.

3. In a raisin cleaning apparatus a revolving cylindrical screen, a series of wires spaced from each other and from said screen and adjacent thereto for supporting a raisin on end with its stem end protruding through said screen, and a revolving fan element adjacent said screen for knocking said stems from said raisins.

4. In a raisin cleaning apparatus, in combination, inner and outer cylindrical screens between which raisins are fed, said screens being adapted to rub raisins therebetween, spaced wires fixed on each screen to hold raisins on end upon said screens, whereby the stem ends will protrude through said screens, and means moving along the said screens to knock the protruding stems therefrom.

5. In a raisin cleaning apparatus, two screens adapted to have raisins therebetween, means for moving said screens relative to each other, means fixedly mounted on said screens for holding raisins on end with their stems protruding through said screens, and means moving adjacent said screens for knocking said stems from said raisins.

Signed at Orosi, Tulare County, California, this 22nd day of April, 1927.

CEPHAS U. FRAZIER.